Dec. 31, 1957  C. D. COWBURN ET AL  2,817,999
AUTOMATIC GUN LINK CHUTES
Filed April 13, 1956
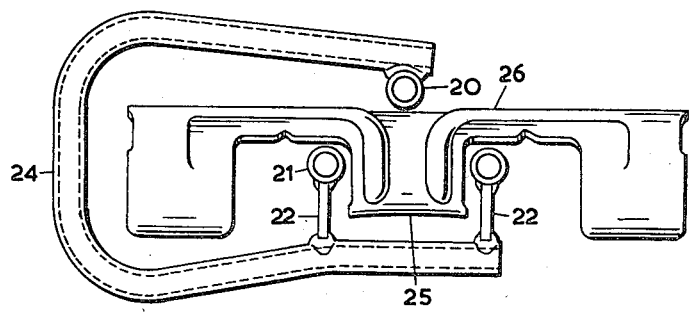
Inventors:
Clarence D. Cowburn
and
Frank W. Proudlove
By
Attorney United States Patent Office 2,817,999
Patented Dec. 31, 1957

2,817,999

AUTOMATIC GUN LINK CHUTES

Clarence Duncan Cowburn, Croston, near Preston, and Frank William Proudlove, Lytham, England, assignors to The English Electric Company Limited, London, England, a British company Application April 13, 1956, Serial No. 578,026

Claims priority, application Great Britain April 22, 1955

1 Claim. (Cl. 89—33)

The invention relates to link chutes for ammunition links having horns in the middle of their length gripping the cartridges of an automatic gun for high speed service aircraft, for example for jet propelled fighter aircraft.

On such high speed aircraft it is necessary to retain all the empty links inside the aircraft, and not to eject them as it was possible with comparatively slow flying aircraft.

In jet propelled fighter aircraft having both the jet engines and the automatic guns installed closely to one another in the fuselage or wings the spatial conditions are rather restricted, and it is desirable to be able to curve the chute for the empty links at the smallest possible radius of curvature in any direction, for example in the horizontal direction.

According to the invention the chute for the empty links cases is constituted by an open gutter profile or by a pair of parallel rods on which the hooks of the links are guided.

In order that the invention may be clearly understood, some embodiments thereof will now be described with reference to the accompanying drawing which is a typical section of an embodiment of a chute according to the invention.

Referring now to drawing, a tubular rod 20 is supported by the upper legs of U-shaped tubular brackets 24 opposite the centre between two further tubular rods 21 supported on the lower legs of the said U-shaped brackets 24 by means of lugs 22. These tubular rods 21 serve for guiding the flanks of the hook 25 of an empty ammunition link 26, and said tubular rod 20 for guiding the back of said link 26. In a filled link 26 said hook 25 which is in the middle of the length of a link 26 grips the cartridge 27 indicated in chain-dotted lines.

The chute specifically described has proved particularly effective for a gun having a fast rate of firing, and jamming of the empty links was safely prevented in spite of the jerky and intermittent movement involved.

What we claim as our joint invention and desire to secure by Letters Patent is:

A chute for empty ammunition links having hooks in the middle of their length gripping the cartridges of an automatic gun, said chute comprising in combination: a pair of rods running parallel to one another, a third rod running parallel to the said pair at a constant spacing opposite the centre line thereof, U-shaped brackets having two legs each, one leg of each bracket being attached to the said third rod, and lugs connecting each of the said pair of rods to the other leg of each of the said brackets, the said pair of rods in operation guiding the horns of the empty links at their flanks and the said third rod guiding the backs of said hooks in the longitudinal direction of the said rods, the said links being prevented from moving perpendicular to the said direction by the constant spacing of the said third rod from the said pair of rods.

References Cited in the file of this patent

UNITED STATES PATENTS 2,466,893    Holton _____ Apr. 12, 1949

FOREIGN PATENTS 574,962    Great Britain _____ July 11, 1938